(12) United States Patent
Nespeca

(10) Patent No.: US 8,899,406 B2
(45) Date of Patent: Dec. 2, 2014

(54) SYSTEM, MECHANISM, AND METHOD FOR PHYSICALLY MANIPULATING MEDIA

(75) Inventor: Nicholas Aldo Nespeca, Boulder, CO (US)

(73) Assignee: Spectra Logic, Corporation, Boulder, CO (US)

(*) Notice: Subject to any disclaimer, the term of this patent is extended or adjusted under 35 U.S.C. 154(b) by 173 days.

(21) Appl. No.: 13/589,751

(22) Filed: Aug. 20, 2012

(65) Prior Publication Data
US 2014/0048389 A1   Feb. 20, 2014

(51) Int. Cl.
*B65G 47/34* (2006.01)

(52) U.S. Cl.
USPC .............. 198/468.6; 369/30.43; 294/192

(58) Field of Classification Search
CPC .. B65G 47/901; B65G 47/907; B65G 47/918; G11B 17/225; B25J 15/0028

USPC ............ 198/468.6, 346.1, 346.2, 346.3; 369/178.01, 34.01, 36.01, 38.01; 294/106, 192, 86.4

See application file for complete search history.

(56) References Cited

U.S. PATENT DOCUMENTS

| | | | |
|---|---|---|---|
| 4,827,463 A * | 5/1989 | Motoyoshi et al. | 369/30.43 |
| 5,014,255 A | 5/1991 | Wanger et al. | |
| 5,487,579 A | 1/1996 | Woodruff | |
| 5,746,464 A | 5/1998 | Paul | |
| 5,805,561 A * | 9/1998 | Pollard | 369/30.43 |
| 5,966,366 A * | 10/1999 | Pollard | 369/30.43 |
| 6,454,509 B1 | 9/2002 | Kappel et al. | |
| 7,212,375 B2 * | 5/2007 | Dickey et al. | 360/96.4 |
| 8,528,952 B2 * | 9/2013 | Ostwald et al. | 294/192 |

* cited by examiner

*Primary Examiner* — James R Bidwell
(74) *Attorney, Agent, or Firm* — Kenneth Altshuler

(57) ABSTRACT

A system, mechanism, and method for physically manipulating media, especially in a data storage environment.

20 Claims, 16 Drawing Sheets

SYSTEM, MECHANISM, AND METHOD FOR PHYSICALLY MANIPULATING MEDIA

FIELD OF THE INVENTION

The present invention generally relates to the physical manipulation of media such as magnetic tape cartridges and optical disc cartridges, and more particularly to manipulating such media in a data storage library environment.

BACKGROUND OF THE INVENTION

Data is recorded on materials such as magnetic tapes and optical discs, which are contained in cartridges for both protection and ease of handling. Many of such cartridges may be stored in what is known as data storage libraries for potential later use.

Typically, the media is initially introduced into the library through a so-called mail slot or simply by hand placement. The media is then stored in one of many storage slot locations throughout the library. When there is a desire to use the media, the media is transferred from a storage slot via a transport assembly or robot to a drive for the operations of either writing data onto or reading data from the media. Upon completion of that operation, the media is returned via the robot to the same or a different storage slot for possible future use.

Each robot has a sophisticated picker assembly designed to grasp media from a storage slot, retain the media during transport within the library, insert and deposit the media into the drive, grasp and retrieve the media from the drive, retain the media during transport back to a storage slot, and insert and deposit the media into the storage slot. The picker assembly is designed and configured to accommodate the structure and other characteristics of the particular media employed in the data storage library.

Each picker assembly usually includes a carriage provided with clamps or jaws designed to grasp the media at opposing surfaces and includes software and other mechanisms designed to selectively grasp, move, and release the media.

Most carriages are electromechanically controlled and operated via motors or solenoids that are selectively activated to perform the grasping, moving, and releasing functions of the carriage. The present invention relates to a so-called "passive" carriage in which the grasping, moving, and releasing functions are accomplished without conventional electromechanical actuation. Accordingly, the present invention achieves savings by tending to lower the cost of construction, operation, and repair of, and by improving the reliability of operation of, picker assemblies employed in data storage libraries.

SUMMARY OF THE INVENTION

The present invention relates to a system, mechanism, and method for physically manipulating media, especially in a data storage environment.

BRIEF DESCRIPTION OF THE DRAWINGS

The present invention will be described with reference to the following drawings, wherein.

DESCRIPTION OF A PREFERRED EMBODIMENT

Figure 1A:
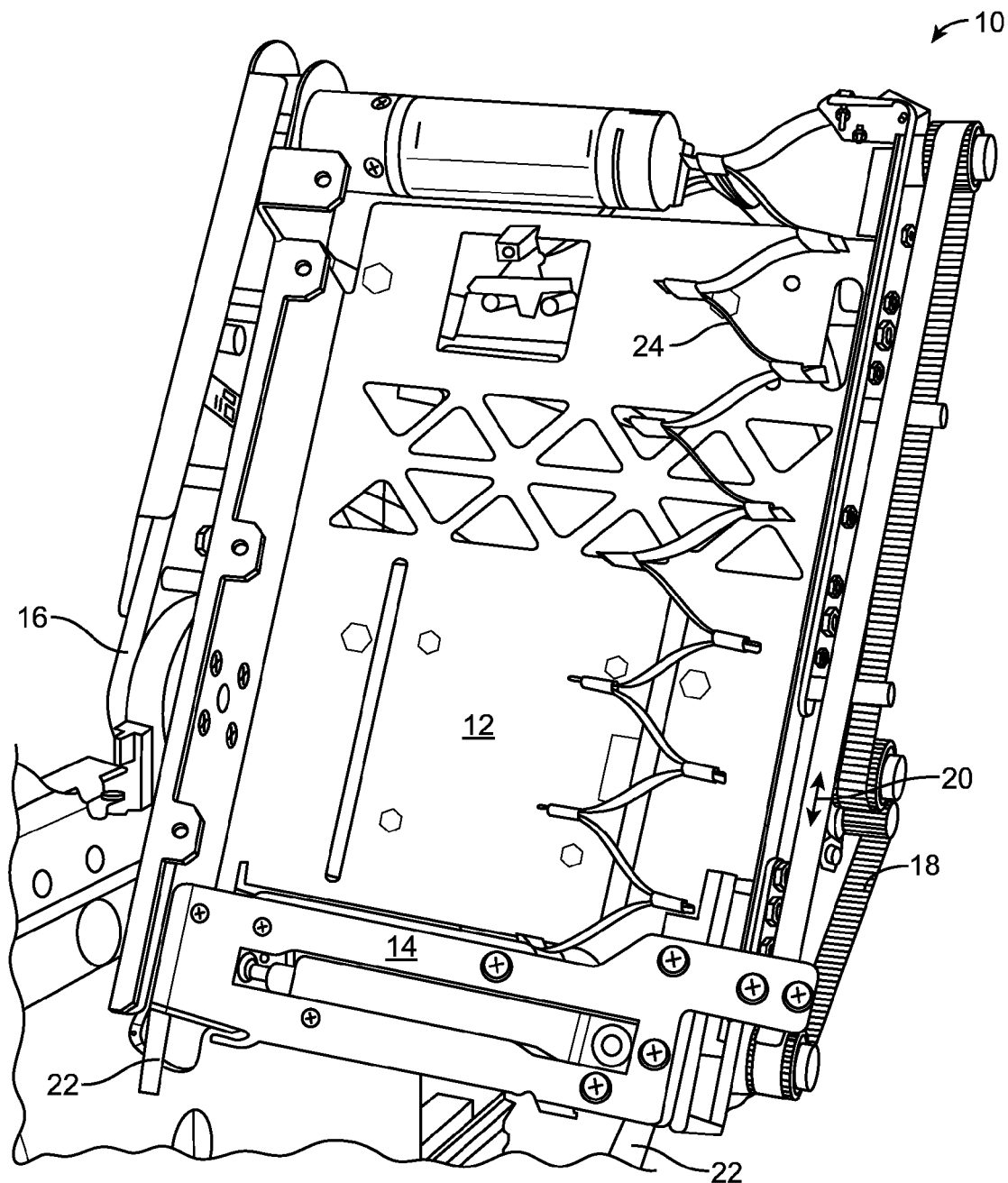
FIG. 1A is a perspective view of a conventional picker assembly used in a data storage library, with the carriage in a relatively extended position.
Figure 1B:
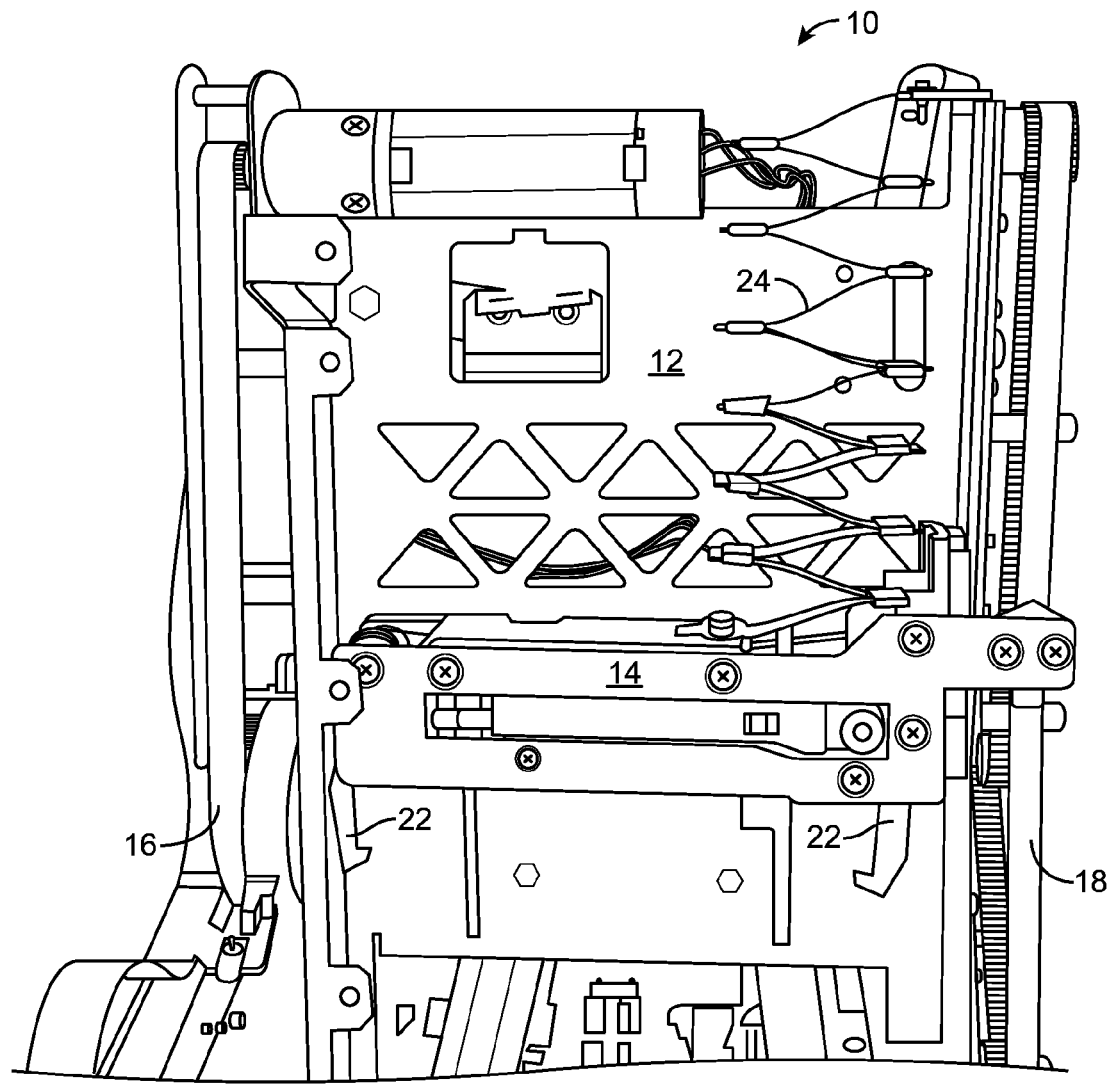
FIG. 1B is a plan view of the picker assembly shown in FIG. 1A, with the carriage in a relatively retracted position.

The present invention will be described with reference to the accompanying drawings wherein like reference numerals refer to the same item. It should be appreciated that the following description is intended to be exemplary only and that the scope of the invention envisions other variations and modifications of these particular exemplary embodiments.

There is shown in FIGS. 1A and B, a picker assembly 10 generally including a tray or housing 12 within which a carriage 14 reciprocally translates. The picker assembly RAX Rotation AXis 10 includes a motor-powered drive belt 16 as well as an endless, looped transmission belt 18 for the PAX Pick AXis. The carriage 14 is secured at one lateral end thereof to the transmission belt 18 for concomitant movement with the transmission belt 18. As illustrated by the bi-directional arrow 20 shown in FIG. 1A, the transmission belt 18 may translate in either of two directions, and similarly, the carriage 14 may translate within the housing 12 in either of those two directions.

The carriage 14 includes a pair of spaced, pivoted arms 22 that are adapted in a manner well known to those skilled in the art for grasping and releasing media within a data storage library. In the conventional picker assembly 10 shown in FIGS. 1A and B, the jaws 22 are actuated by an electrical actuator or motor (not shown) mounted to and beneath the carriage 14. Electrical current is supplied to the actuator or motor by means of a ribbon or flex cable 24 that is designed to extend and retract as the carriage 14 reciprocally translates within the housing 12. The present invention may be utilized without an electrical connection such as the ribbon cable 24 and without the actuator or motor for operating the jaws 22.

There is shown in FIGS. 2-7, a carriage 100 in accordance with one embodiment of the present invention. The carriage 100 generally includes a main body portion 102 and a plate 104. The main body portion 102 and the plate 104 are preferably fashioned of a hard plastic, but may be fashioned of a variety of other suitable materials, such as metal. The plate 104 is pivotably mounted to and secured to the main body portion 102 by means of a pivot pin 106 that laterally extends through sections of the main body portion 102 and the plate 104.

Figure 5:
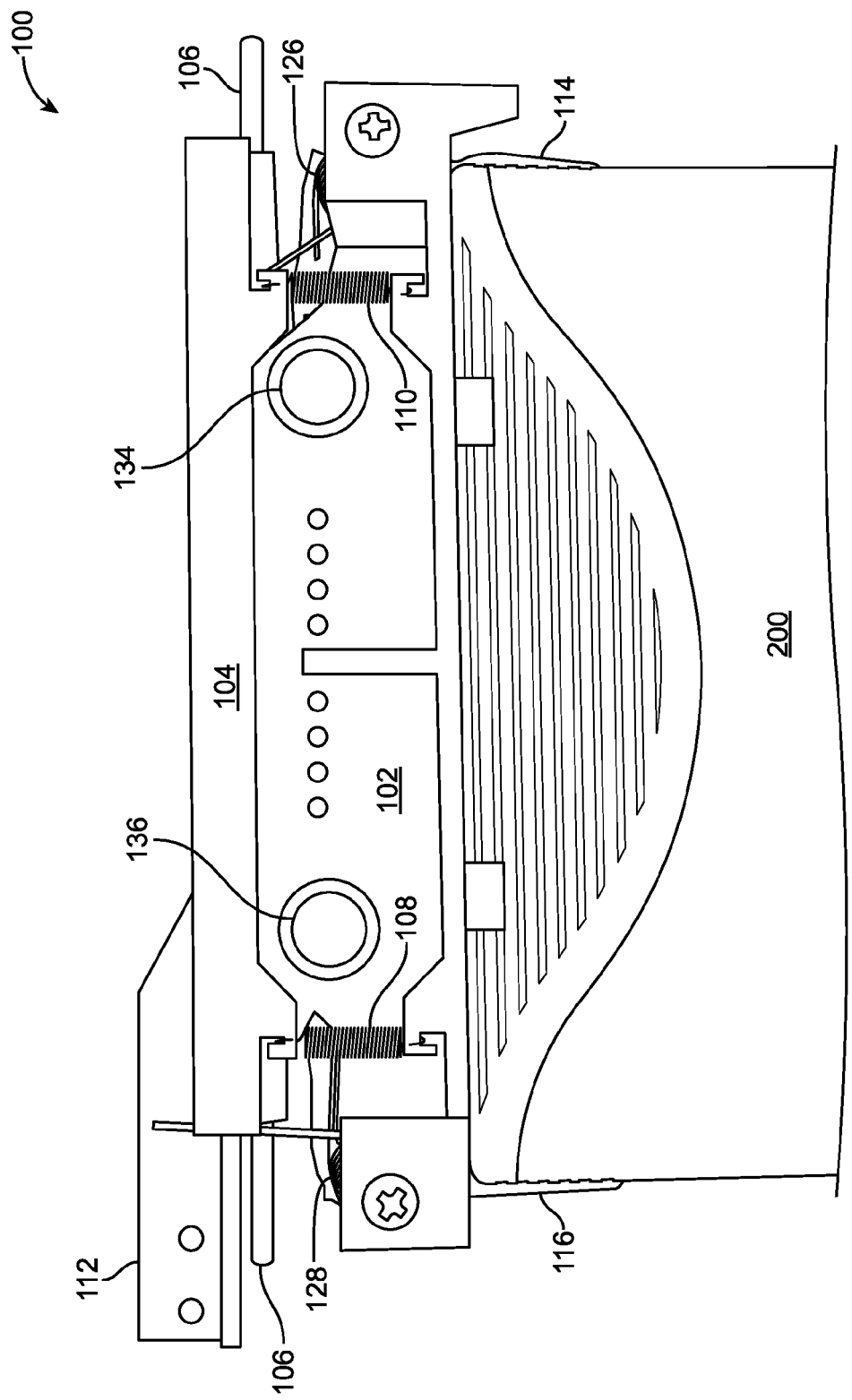
FIG. 5 is a plan, rear view of the carriage shown in FIG. 4.
Figure 6:
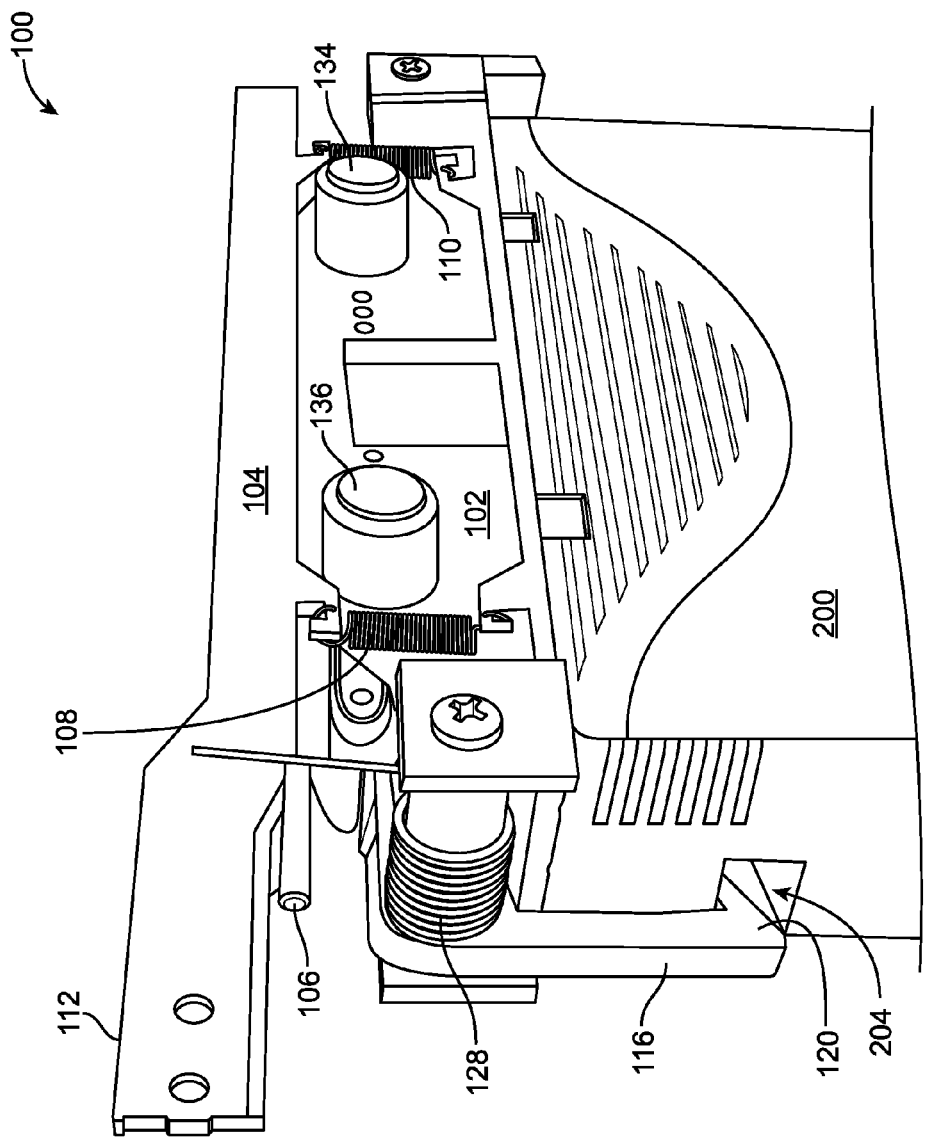
FIG. 6 is a perspective view of the carriage shown in FIG. 4.

The plate 104 is biased toward a first position that is generally away from the main body portion 102 by a pair of coiled extension springs 108, 110, as best shown in FIGS. 5 and 6 acting on the rear portions of the main body portion 102 and the plate 104. The plate 104, instead of being pivotably connected to the main body portion 102, may be slideably connected to move toward and away from the main body portion 102, and alternatively, a compressive spring may act to bias the plate 104 toward the first position away from the main body portion 104.

The plate 104 includes an integrally formed extension ledge 112 at one lateral end thereof that is adapted to be secured to a mechanism for translating the carriage 100, such as the endless, looped belt 18 shown in FIGS. 1A and B. For that purpose, the ledge 112 is provided with a pair of apertures through which screws, bolts, or other securing means may be employed.

Figure 2:
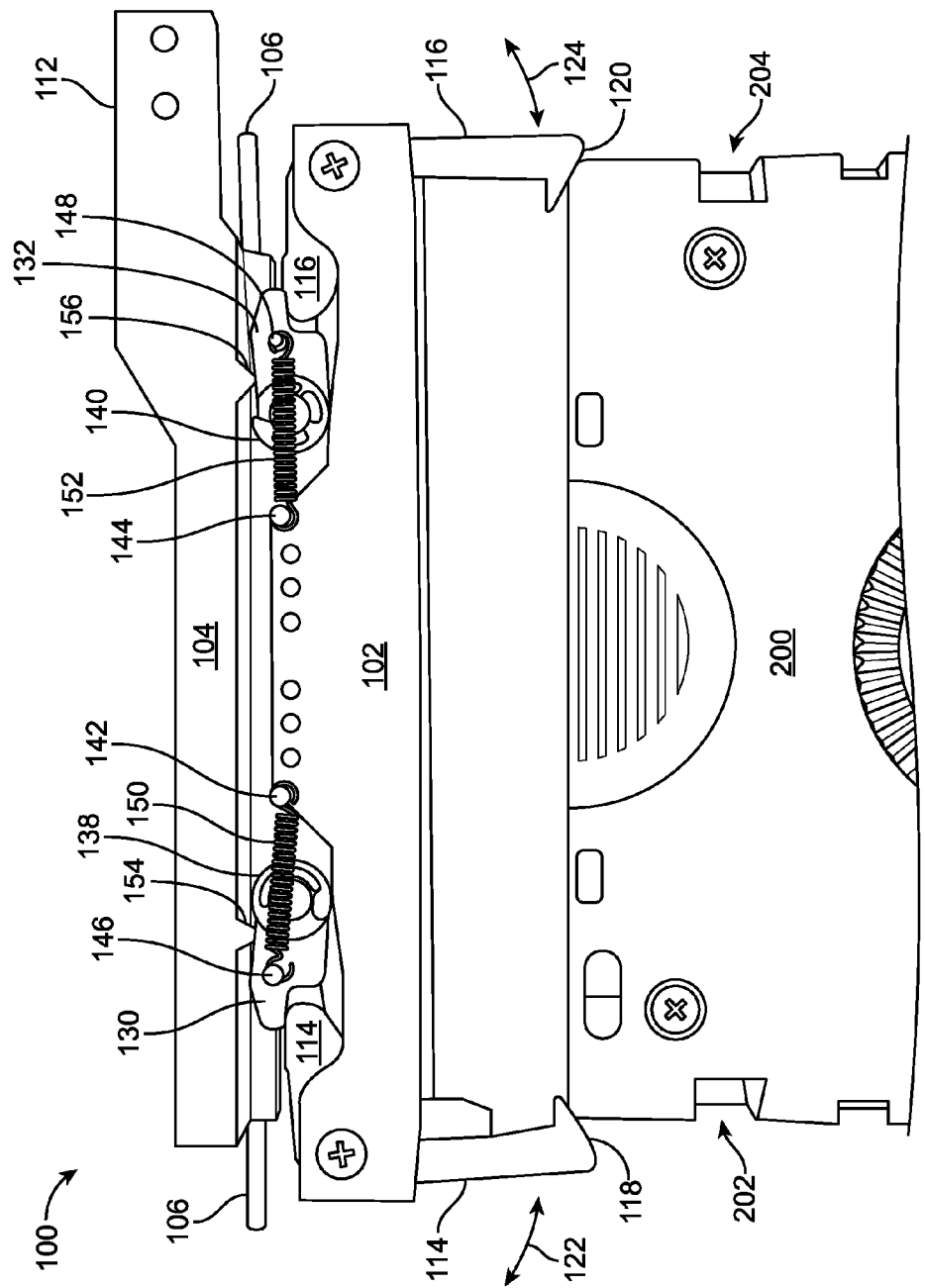
FIG. 2 is a plan view of the front of a carriage in accordance with one embodiment of the present invention in which the gripper fingers abut a peripheral surface of an associated media, such as a magnetic tape cartridge.
Figure 3:
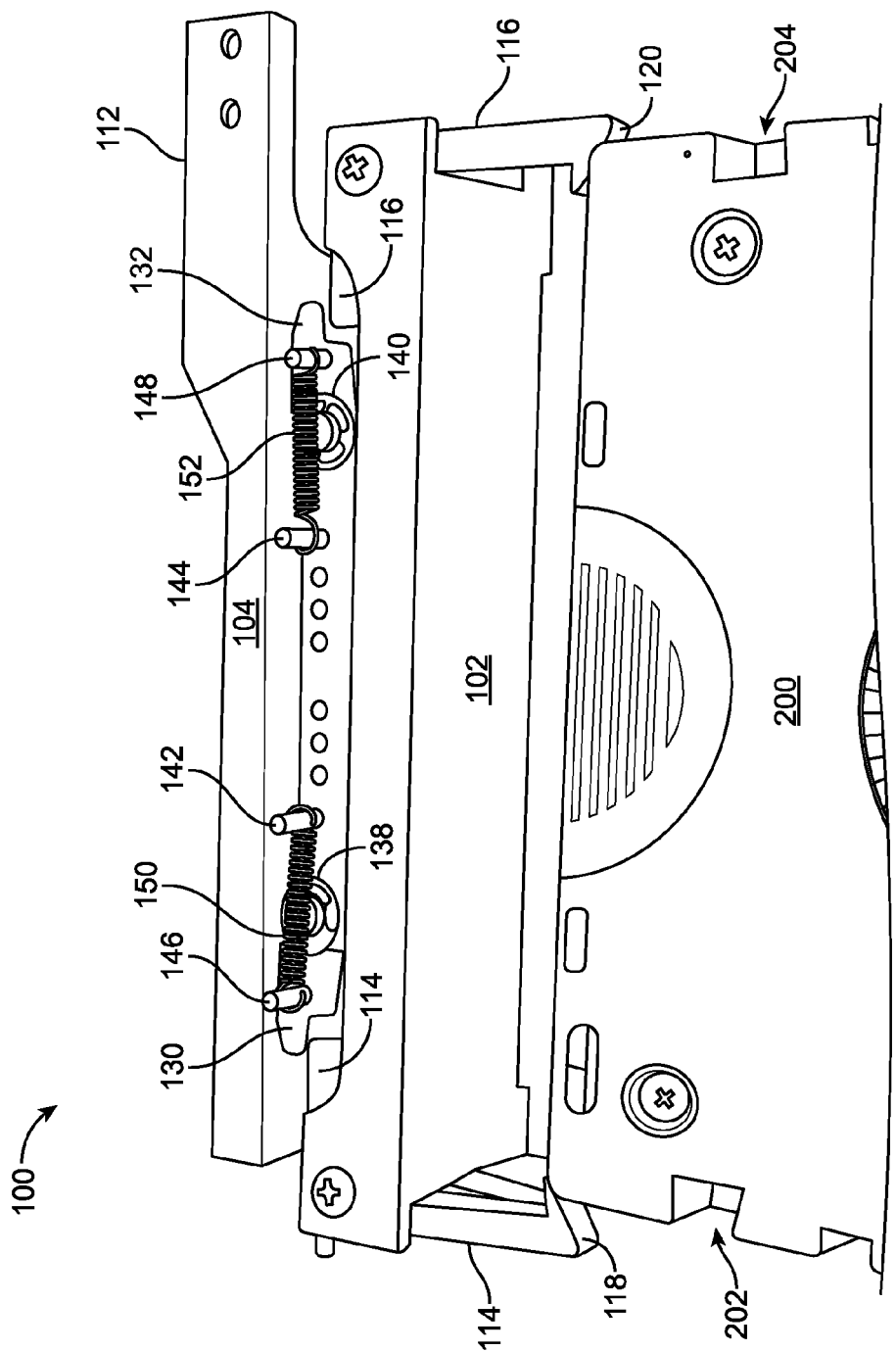
FIG. 3 is a perspective view of the carriage shown in FIG. 2.
Figure 7:
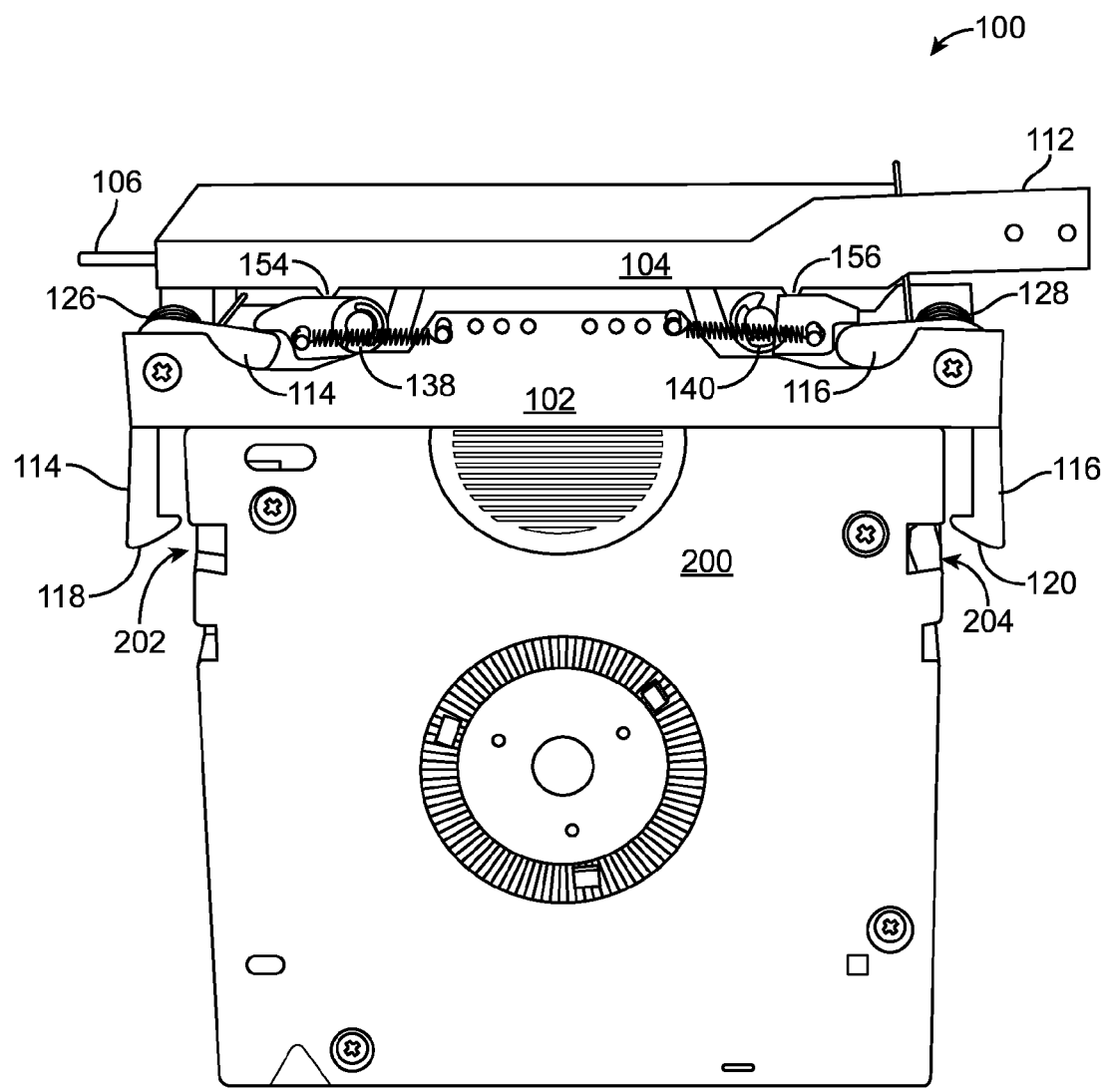
FIG. 7 is a plan, front view of the carriage shown in FIG. 4 with the gripper fingers disengaged from the corresponding recesses in the opposing, peripheral surfaces of the media.

A pair of arms 114, 116 are pivotably mounted to the main body portion 102, with a lower end of each arm 114, 116 configured as a corresponding hook or finger 118, 120 extending and pointing in a laterally inward direction. Each finger 118, 120 preferably possesses a lower beveled surface. The arms 114, 116 generally pivot or swing in either of the directions as indicated by the bi-directional arrows 122, 124 in FIG. 2. FIG. 2 shows the arms 114, 116 in their inner-most degree of pivoting, which is limited by the stop or abutment of each arm 114, 116 with the main body portion 102, as best shown in FIG. 3. The outer-most degree of pivoting of the arms 114, 116 is shown in FIG. 7, which is limited by a stop or abutment of the upper distal ends of the arms 114, 116 with a lower, adjacent surface of the main body portion 102. Each of the arms 114, 116 is biased toward a pivotably inward position by means of an associated coil torsion spring 126, 128, as best shown in FIGS. 5, 6, and 7.

The carriage 100 further includes a pair of toggles or actuators 130, 132 associated with corresponding ones of the arms 114, 116. The actuators 130, 132 are secured to the main body portion 102 by associated, corresponding pivot pins 134, 136 and associated, corresponding snap rings 138, 140. One end of each actuator 130, 132 is designed and configured to overlie and abut an associated upper distal end of an associated, corresponding arm 114, 116, as best shown in FIGS. 2, 3, and 4.

The carriage 100 also includes a pair of biasing means designed to apply a overcenter force to an associated toggle or actuator 130, 132, such that in one position of stability, the associated actuator 130, 132 does not act forcibly against the associated upper distal end of the arm 114, 116, and in the other position of stability, the associated actuator 130, 132 does provide forceful abutment against the associated upper distal end of the associated arm 114, 116 sufficient to overcome the bias of the torsion springs 126, 128 whereby the associated arm 114, 116 is biased in a pivotably outward direction.

Each of the bi-stable biasing means includes a planting pin 142, 144 anchored to the main body portion 102 laterally inward from the pivot pins 134, 136. Each biasing means also includes an associated anchor pin 146, 148 anchored into an associated, corresponding one of the actuators 130, 132 on the side laterally outward with respect to the corresponding pivot pins 134, 136. Each biasing means also includes a coiled extension spring 150, 152 extending between an associated, corresponding set of the planting pins 142, 146 and the anchor pins 144, 148, respectively. The force of the springs 150, 152 may be effectively changed by either changing the nature of the spring itself or by changing the location of the planting pins 142, 144 in a selected one of a plurality of laterally spaced holes in the main body portion 102, as best shown in FIGS. 2-4.

Figure 4:
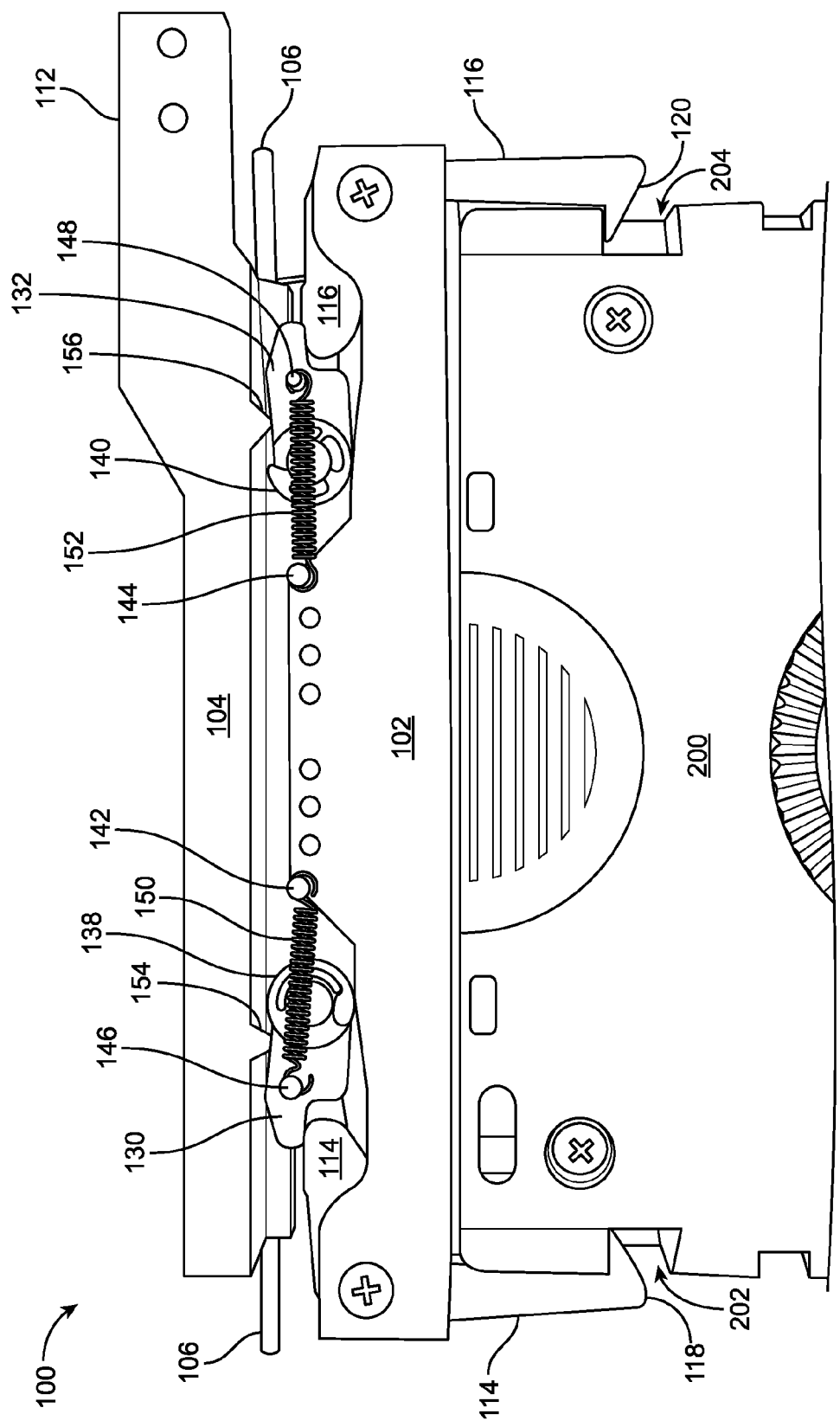
FIG. 4 is a plan view of the carriage shown in FIG. 2, with the gripper fingers disposed generally along opposing peripheral surfaces of the media and in which the fingers are engaged within corresponding recesses in each opposing peripheral surface.

The bi-stability of the biasing means is accomplished by arranging the longitudinal axis of the coiled spring such that such axis is either above or below the axial center of the pivot pins 134, 136, as best shown in FIGS. 4, 5, and 7. It will be appreciated that in the arrangement shown in FIGS. 2 and 4, the longitudinal axis of each coiled spring 150, 152 is disposed above the central axis of the associated pivot pin 134, 136, in which event the actuators 146, 148 are biased by the springs 150, 152 away from the associated upper distal end of the arms 114, 116 and such that the torsion springs 126, 128 act upon each associated arm 114, 116 to pivot the arms 114, 116 to a laterally inward position, and that in the arrangement shown in FIG. 7, the longitudinal axis of each coiled spring 150, 152 is disposed beneath the central axis of the associated pivot pin 134, 136, in which event each actuator 146, 148 is in forceful engagement with the associated upper distal end of an arm 114, 116 such that the springs 150, 152 override the force of the torsion springs 126, 128 to cause the arms 114, 116 to extend in and to be maintained in an outwardly pivoted position. The biasing means shown in the foregoing embodiment of the present invention is sometimes known as an "overcenter" arrangement of a spring.

The plate 104 pivots abut the associated pivot pin 106 under the bias of springs 108, 110. The plate 104 is provided with a pair of bosses 154, 156 that are disposed generally above an associated, corresponding actuator 130, 132. When the plate 104 is in a first position, the bosses 154, 156 stop or limit the pivoting of the associated, corresponding actuators 130, 132. However, when the plate 104 is rotated on its associated pivot pin 106 in a relatively downward direction toward the main body portion 102, it will be appreciated that the bosses 154, 156 forcefully abut the associated actuators 130, 132, which in turn forces the associated actuators 130, 132 against the associated upper distal ends of the arms 114, 116 to cause the same to be urged pivotably outward, and which results in the springs 150, 152 being disposed below the central axis of the associated pivot pins 134, 136. This condition is shown in FIG. 7. In such a state, the springs 150, 152 achieve a bi-stable condition that override the force of torsion springs 126, 128 such that the arms 114, 116 maintain a pivotably outward position as shown in FIG. 7. When the plate 104 is no longer forced toward the main body portion 102, against the bias of springs 108, 110, and the plate 104 is released back to the first position, then the arms 114, 116 will continue to maintain the position shown in FIG. 7.

The operation of the carriage shown in the preferred embodiment of FIGS. 2-7 will now be described with reference to a media such as a magnetic tape cartridge 200. As shown in FIGS. 2-7, the media 200 includes a pair of depressions or recesses 202, 204 on each lateral, opposing peripheral edge thereof. Each of the recesses 202, 204 is adapted to selectively receive a corresponding one of the fingers 118, 120. Although the recesses 202, 204 are disclosed for illustrative purposes, it should be appreciated that other types of pick features, such as detentes, may also be advantageously utilized in connection with the present invention.

The picker assembly operates so as to translate the carriage 100 in a downward, extended direction as shown in FIG. 1A. In such a state, the arms 114, 116 are biased and positioned in their most inwardly pivoted position, as shown in FIG. 2, are acting under the bias of their associated, corresponding torsion springs 126, 128, and are preferably not under the influence of the springs 150, 152.

Translation of the carriage 100 continues toward the media 200 until the fingers 118, 120 abut the peripheral corners of the media 200. It will be appreciated that in a preferred embodiment, the beveled portion of the fingers 118, 120 causes the fingers 118, 120 to slide and pivot slightly outwardly as the carriage 100 is further translated towards the media 200.

The carriage 100 continues to be translated toward the media 200 until the fingers 118, 120 are adjacent to the recesses 202, 204 in the media 200, whereupon the fingers 118, 120 snap into the associated, corresponding recesses 102, 104 under the bias of the torsion springs 126, 128. This state of the carriage 100 is shown in FIG. 4.

When the carriage 100 and the media 200 are in a relationship shown in FIG. 4, the carriage 100 is translated in a reverse direction and retracted into the housing 12 by the picker assembly thereby dragging the media 200 along with the carriage 100 into the housing 12. Thereafter, the robot may move the picker assembly 10 to another location in the data storage library for the purpose of depositing the media 200 in a drive, a storage shelf, or another place. When the picker assembly 10 carrying the media 200 in the housing 12 reaches the desired destination, the carriage 100 is translated and extended toward the drive, slot, or other place where the media 200 is to be deposited, with the carriage 100 and the media 200 still in the state shown FIG. 4. The picker assembly 10 continues to translate the carriage 100 in that direction until the media 200 is inserted into the drive, slot, or other place to such a degree that the media becomes immovable, such as by the bottom or rear surface of the media 200 contacting the rear wall of a storage slot or the rear abutment of a drive.

Further translation of the carriage 100 toward the media 200 when the media 200 is in a relatively immovable state causes the plate 104 to be pivoted about its associated pivot pin 106 and against the bias of the springs 108, 110 to the position in FIG. 7, in which the bosses 154, 156 formed on the bottom of the plate 104 forcefully press against the associated, corresponding actuators 130, 132, which forces each actuator 130, 132 against the associated, corresponding upper distal end of the associated, corresponding arms 114, 116 to overcome the bias of the torsion springs 126, 128, and to shift the springs 150, 152 to a "below center" bi-stable position, such that the arms 114, 116 are pivoted in an outward direction as shown in FIG. 7 whereby the fingers 118, 120 become disengaged from the associated, corresponding recesses 202, 204 in the media 200. Because of the bi-stable nature of the springs 138, 140, such springs tend to maintain the arms 114, 116 in a pivotably outward position as shown in FIG. 7, against the bias of the torsion springs 126, 128. With the arms 114, 116 maintained by the springs 138, 140 in the pivotably outward position shown in FIG. 7, the picker assembly then translates and retracts the carriage 100 in a reverse direction, away from the media 200, such that the media 200 remains deposited in the drive, slot, or other place.

As the carriage 100 is moved away from the media 200 in the state shown in FIG. 7 and into the housing 12, the lateral edges of the housing 12 abut the outer surfaces of the arms 114, 116 so as to pivot the arms 114, 116 inwardly, whereupon the bi-stable springs 138, 140 will then move "above center" to a different state of stability and allow the arms 118, 120 to be biased by the torsion springs 126, 128 back to the state shown in FIG. 2.

Figure 8A:
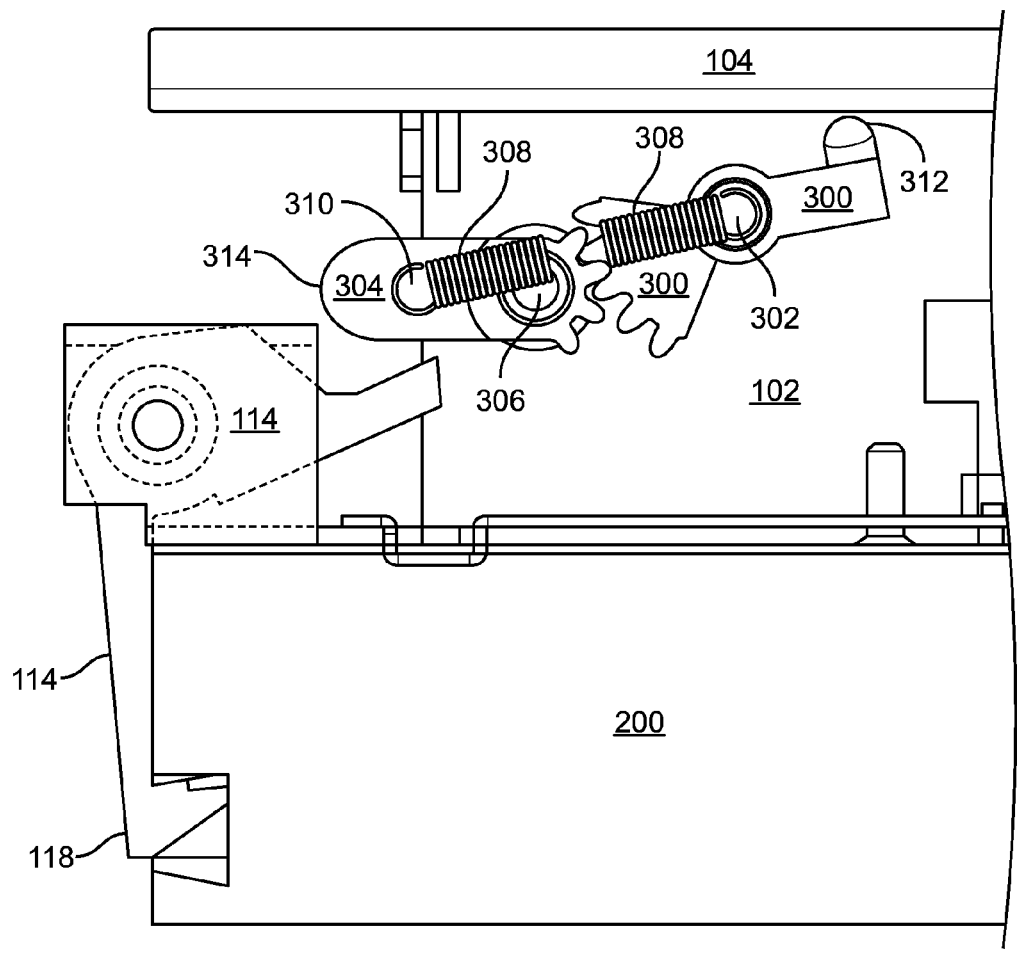
FIG. 8A is a schematic diagram of a portion of a carriage in accordance with another embodiment of the present invention, in which the gripper fingers engage corresponding recesses in the opposing peripheral surfaces of the media.

There is shown in FIGS. 8A and B, a carriage 100 similar to that shown in FIGS. 2-7, with a different mechanical linkage between the plate 104 and the arms 118, 120. FIGS. 8A and B show only one-half of the carriage 100, with it being understood that the carriage 100 shown in FIGS. 8A and B possesses essentially bi-lateral symmetry, but that only one-half of the carriage 100 is shown for simplicity. Instead of the actuators 146, 148 and the bi-stable springs 150, 152 shown in FIGS. 2-7, the embodiment shown in FIGS. 8A and B includes a first actuator lever 300 pivotably mounted about a pivot pin 302 to the main body portion 102, a second actuator lever 304 pivotably mounted about a pivot pin 302 to the main body portion 102, and a coiled extension spring 308 connected at one longitudinal end thereof to the pivot pin 302 and at the other longitudinal end thereof to a pin 310 mounted on the second actuator lever 304. One end of each actuator lever 300, 304 generally faces an end of the other actuator lever 300, 304, and the facing ends of each actuator lever 300, 304 are each provided with a plurality or series of teeth that intermesh.

It will be appreciated after reviewing FIGS. 8A and B that the spring 308 is also bi-stable, and operates in a "overcenter" mode of operation. When the longitudinal axis of the coiled extension spring 308 extends above the axis of rotation of the mounting pin 306, as shown in FIG. 8A, then the spring 308 is in one stable condition. However, when the longitudinal axial of the spring 308 extends below the central axis of the mounting pin 306, as shown in FIG. 8B, then the spring 308 is a second stable condition.

An end of the first actuator lever 300 opposite to the end possessing the plurality of gear teeth is provided with an anvil 312 that generally is positioned to face the plate 104. An end of the second actuator lever 304 opposite to the end of the second actuator 304 possessing the plurality of teeth essentially acts as a boss surface 314.

FIG. 8A shows a state of the carriage 100 in which a plate 104 is in a first position, biased by springs 108, 110 into a relatively open, first position, away from the main body portion 102. In such a state, the boss surface 314 is out of contact with the upper distal end of the arm 114.

Figure 8B:
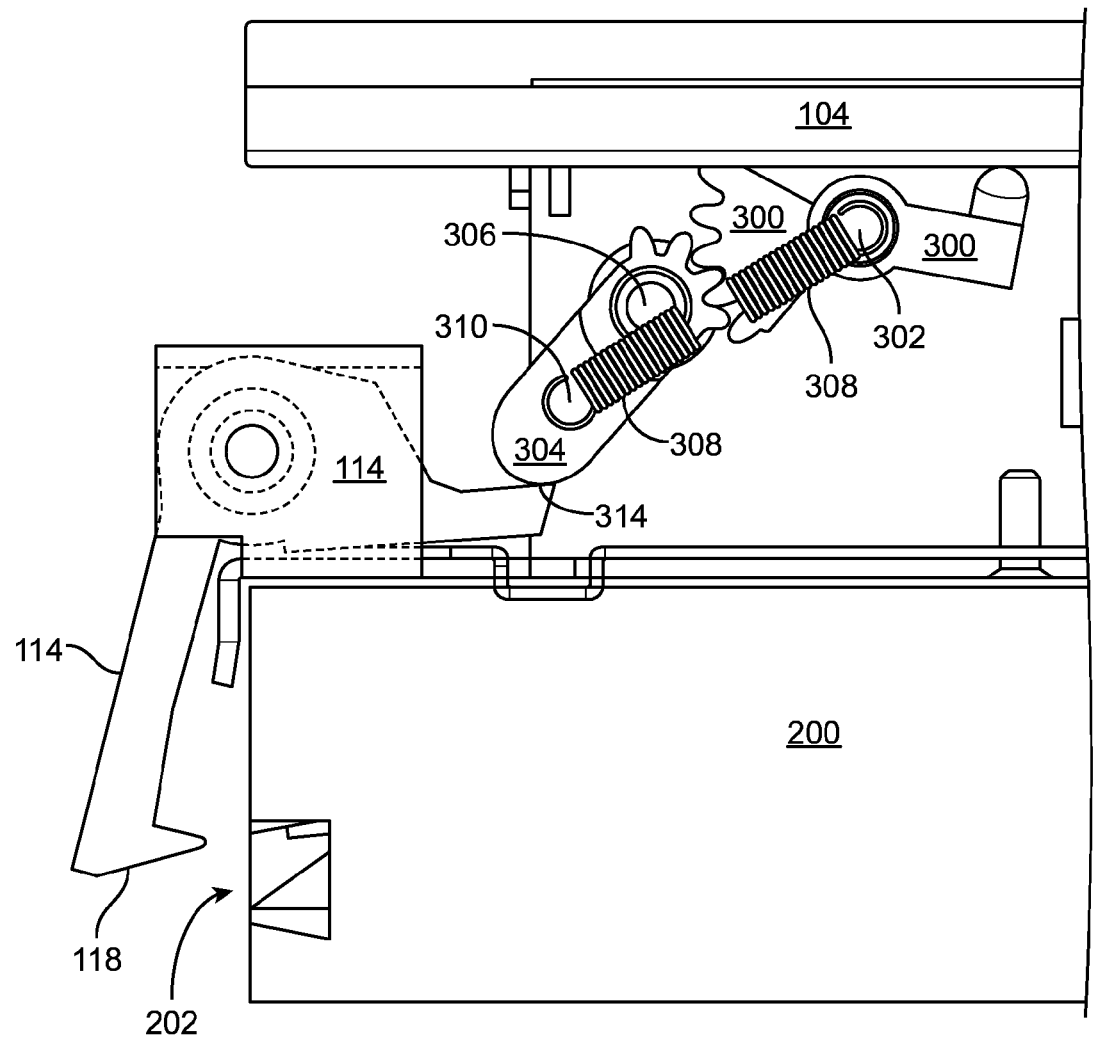
FIG. 8B is a schematic diagram of the carriage shown in FIG. 8A with the gripper fingers disengaged from the recesses.

FIG. 8B shows the state where the plate 104 has been pivoted against the bias of the springs 108, 110 toward the main body portion 102 such that the plate 104 forcibly contacts the anvil 312, depressing the same, and causing the first actuator lever 300 to pivot about pivot pin 302. Because of the intermeshing of the teeth in the facing surfaces of the first actuator lever 300 and the second actuator lever 304, the rotation of the first actuator lever 300 about the pivot pin 302 causes an opposite, concomitant pivot of the second actuator lever 304 about the pivot pin 306, which in turn causes the boss surface 314 to forcefully contact the upper distal end of the arm 114, which causes the arm 114 to pivot outwardly such that the finger 118 becomes disengaged from the recess 202. Because of the bi-stable arrangement of the spring 308, the arm 114 is maintained in the position shown in FIG. 8B until the carriage 100 is withdrawn away from the media 200, translated back into the housing 12, and the side edges of the housing 12 contact the outer surfaces of the arm 114 to cause the linkage mechanism and spring 308 to attain the state shown in FIG. 8A.

Figure 9A:
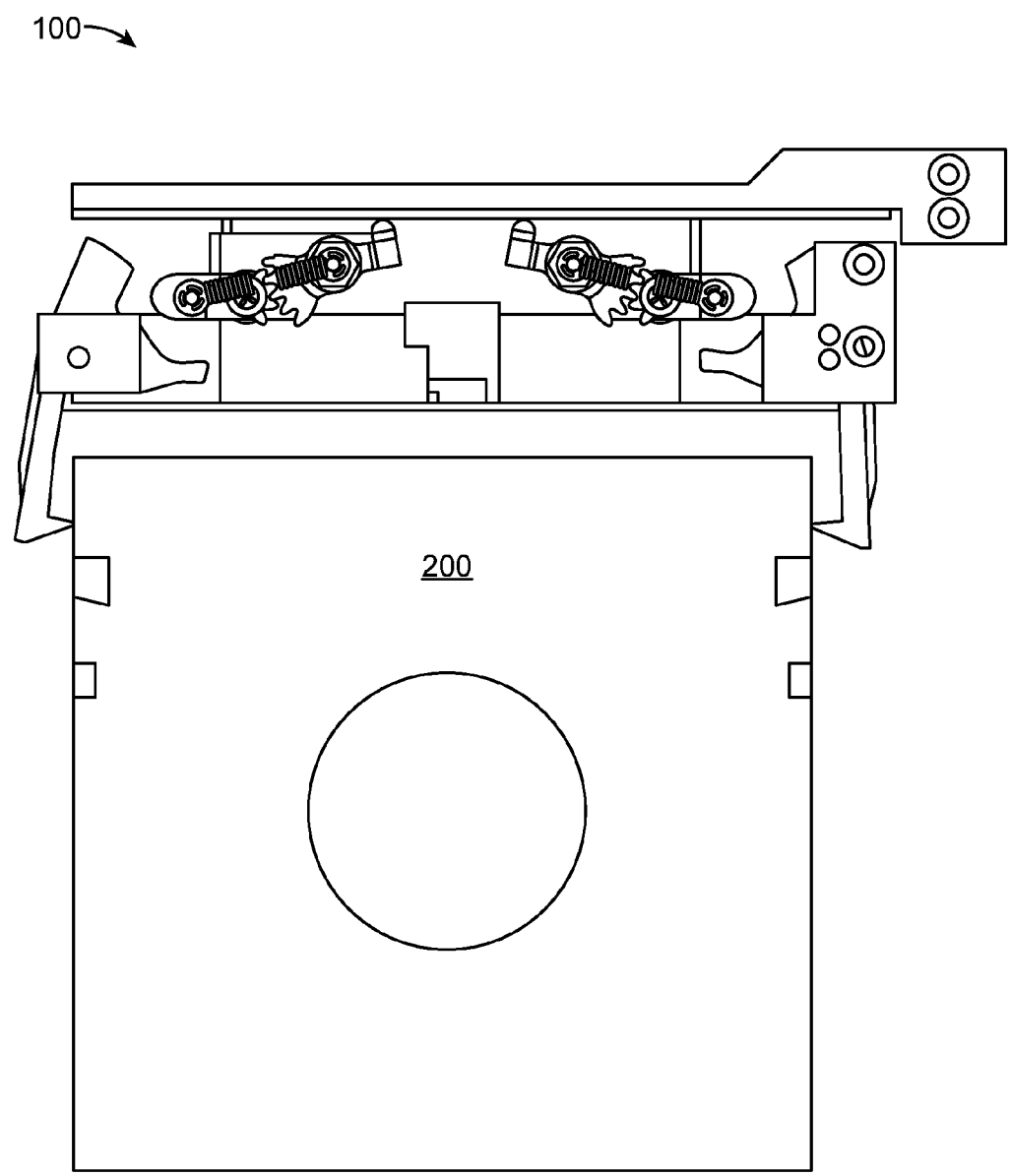
FIGS. 9A-F are schematic diagrams illustrating a sequence of operation of the carriage according to the embodiment shown in FIGS. 8A and B.
Figure 9B:
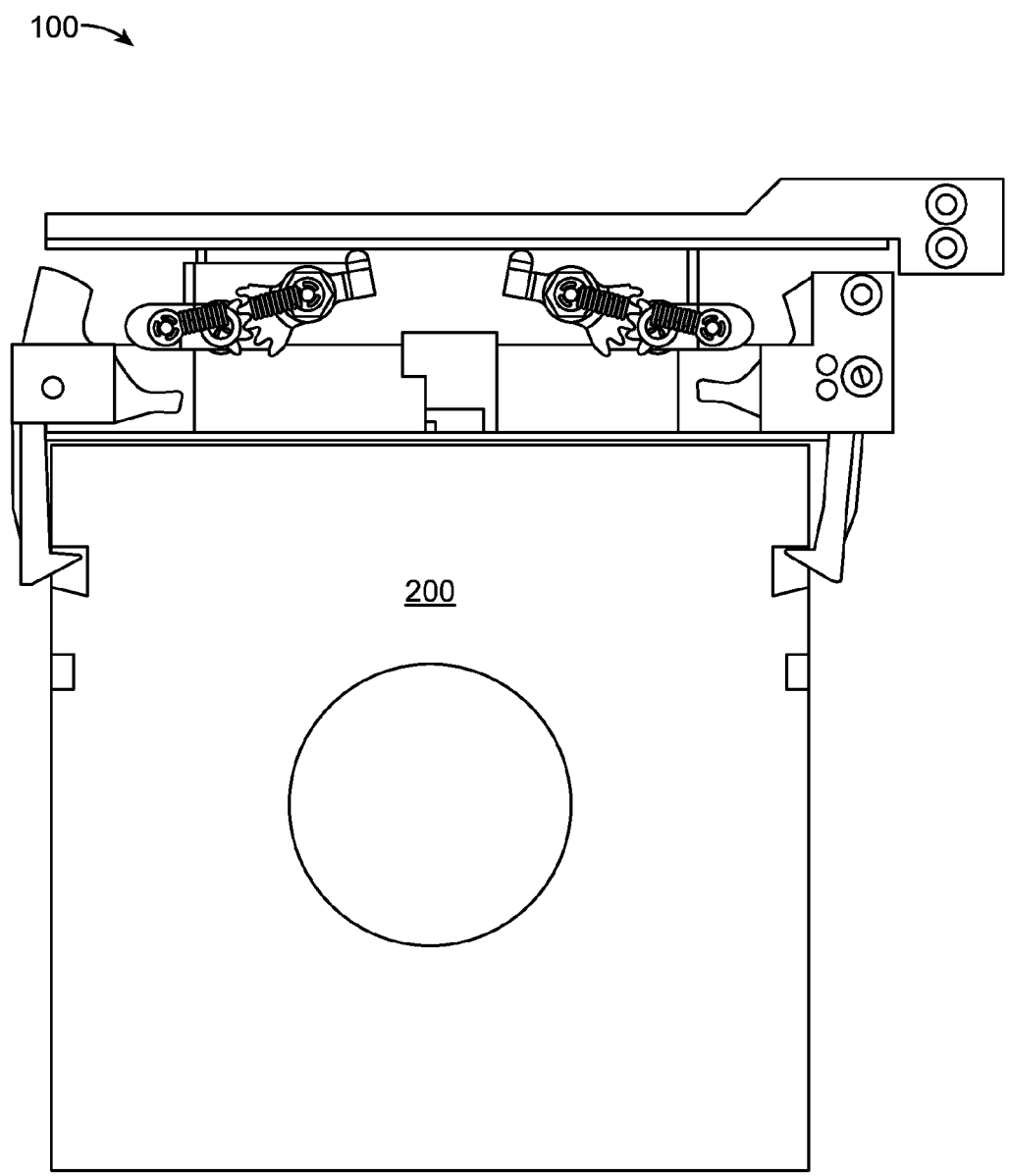
Figure 9C:
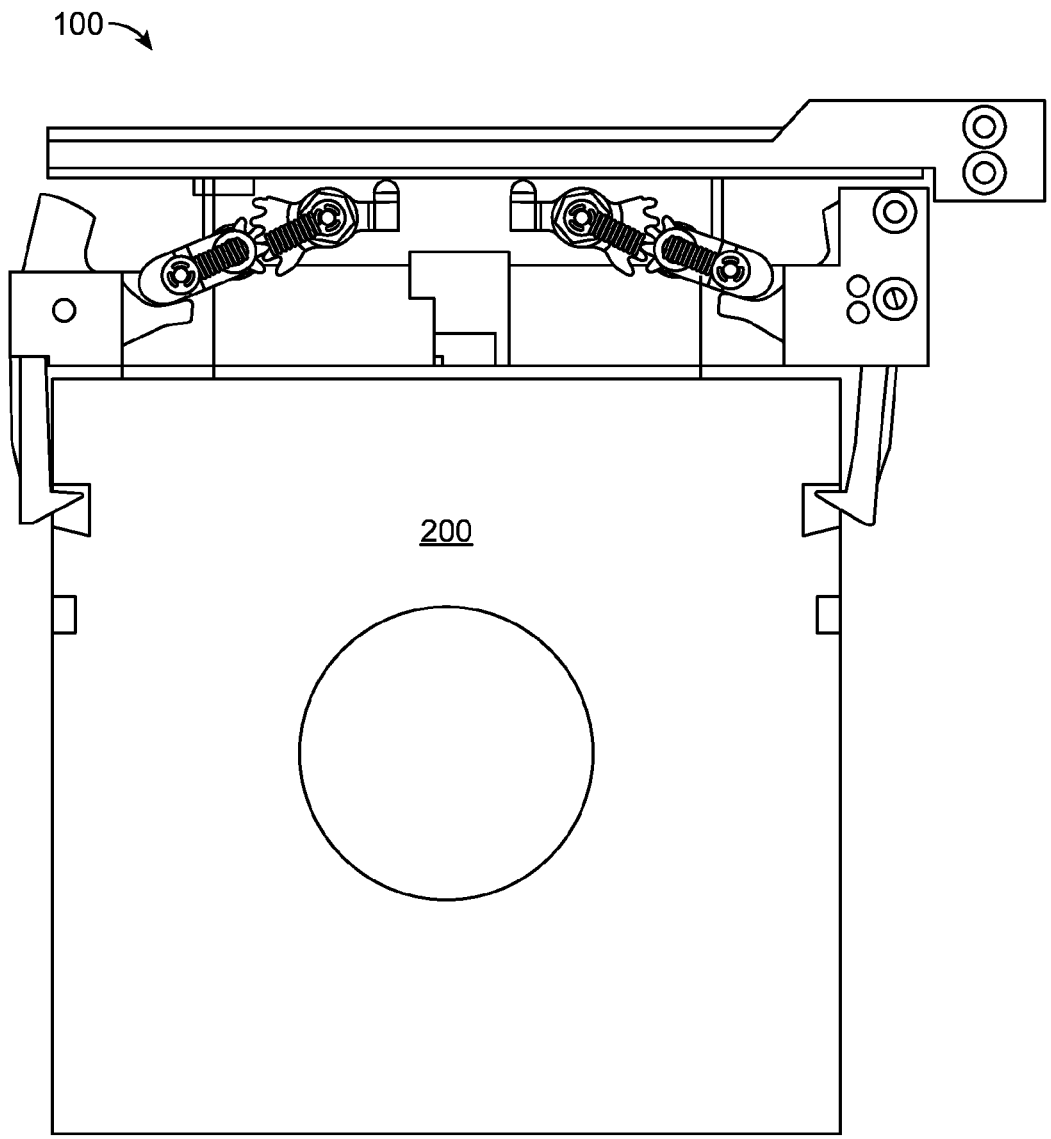
Figure 9D:
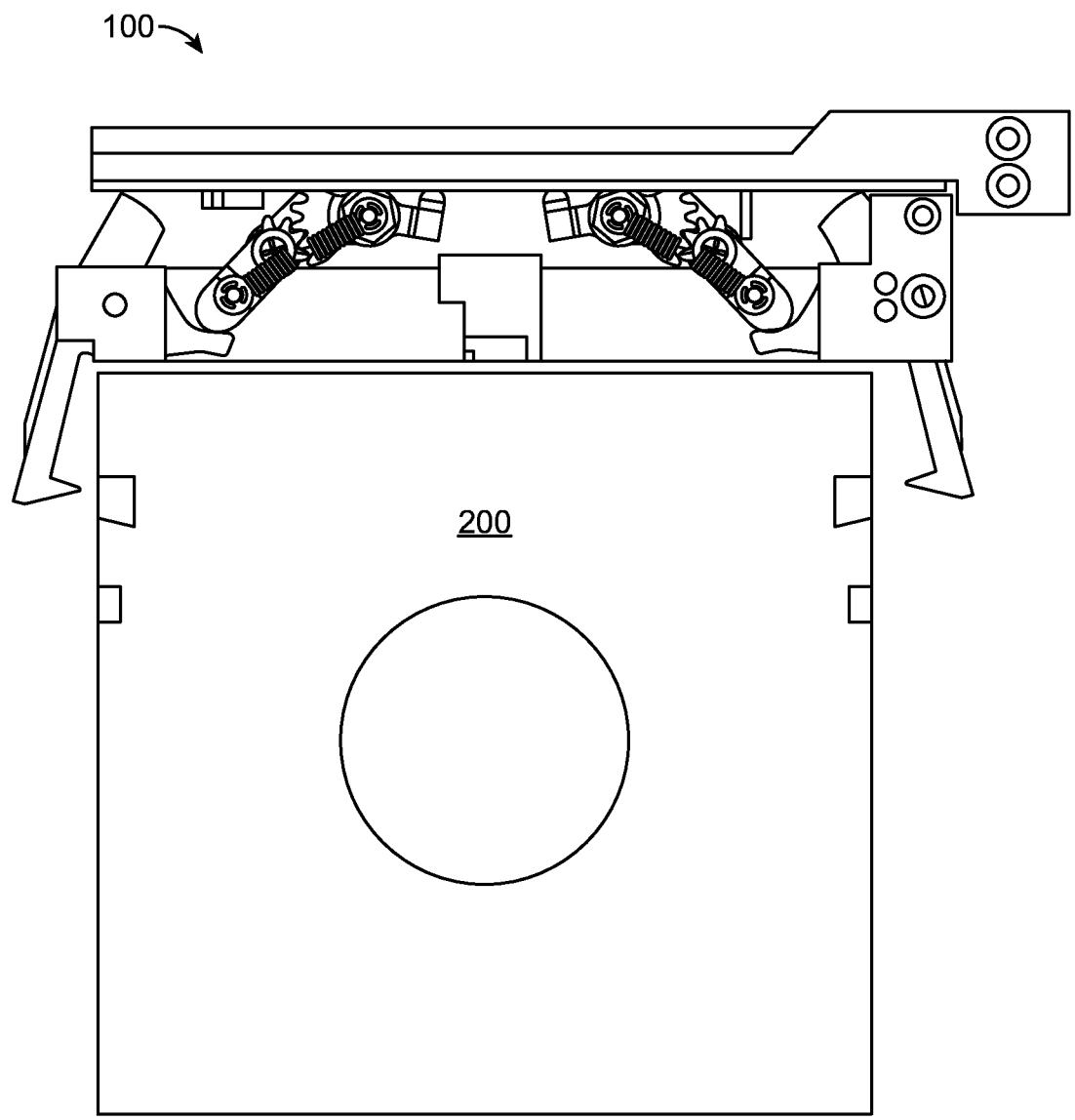
Figure 9E:
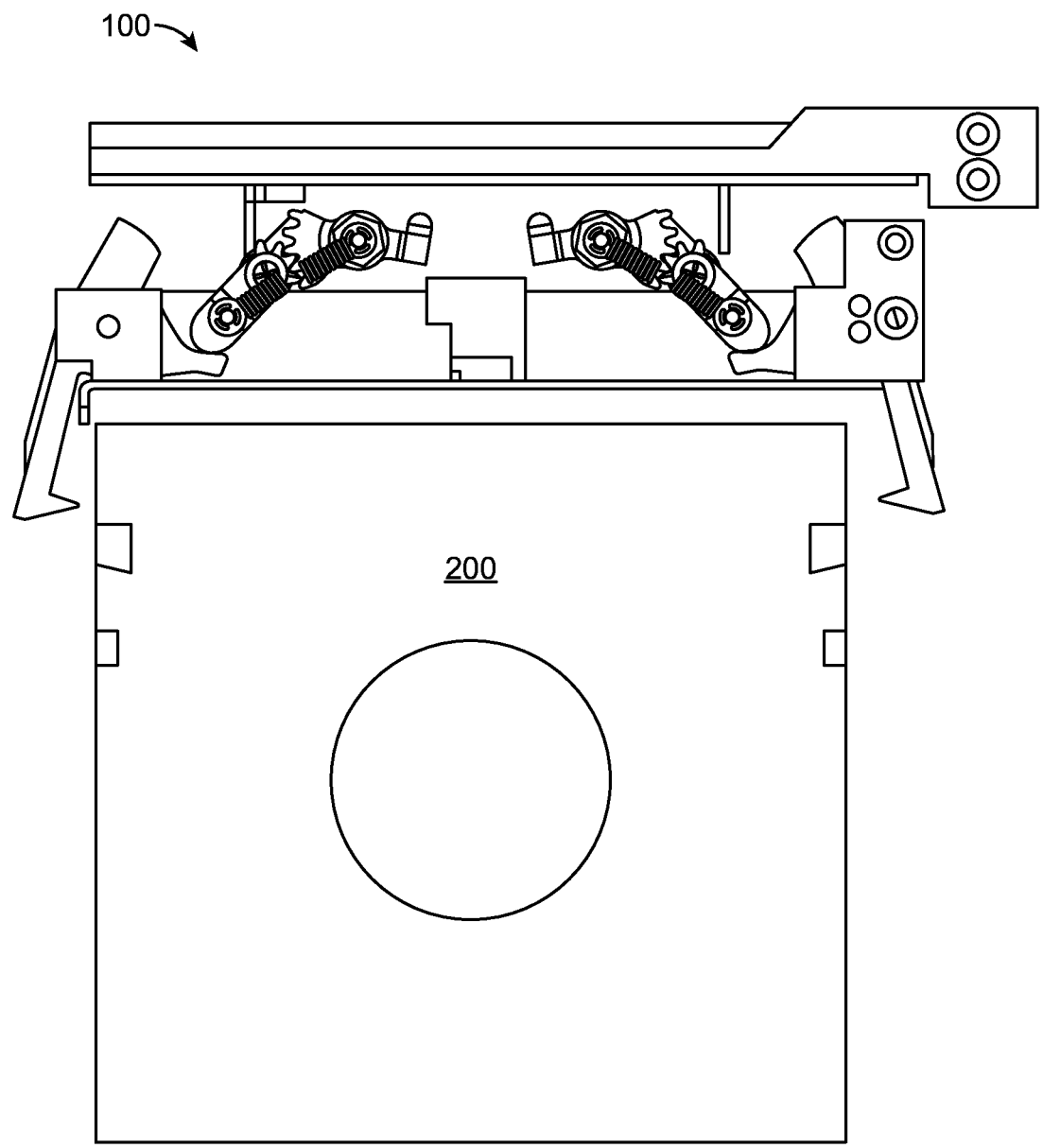
Figure 9F:
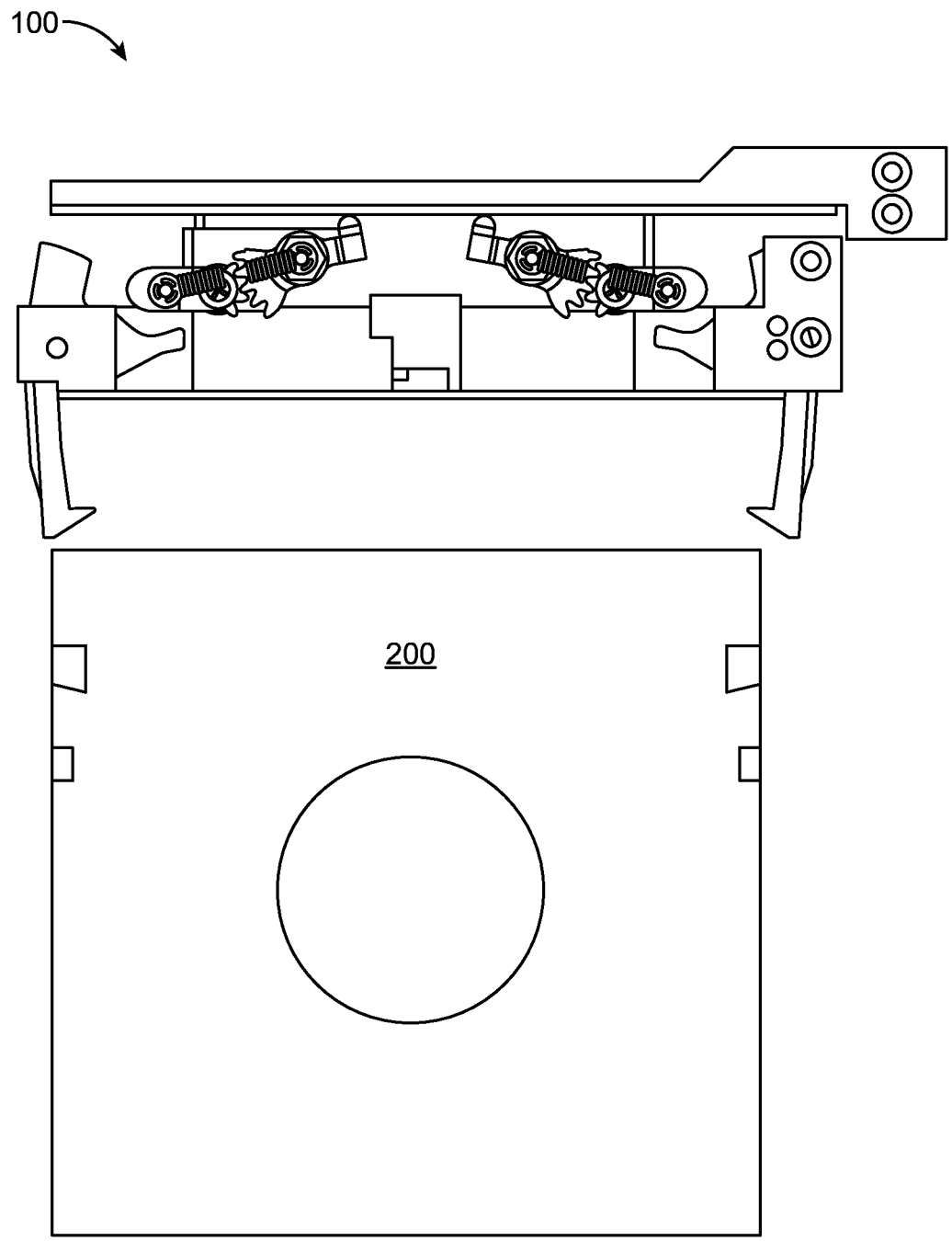

FIGS. 9A-F schematically illustrate the sequence of operation of the carriage 100 in the embodiment shown in FIGS. 8A and B. In FIG. 9A, the carriage 100 translates toward the media 200 and has reached a position after the beveled edges of the fingers 118, 120 have abutted upper peripheral corners of the media 200, and are still acting under the bias of torsion springs 126, 128 to bias the arms 114, 116 in a pivotably inward position. In FIG. 9B, the carriage 100 has translated toward the media 200 to such an extent that the fingers 118, 120 are engaged in the associated, corresponding recesses 202, 204 of the media 200. The direction of translation of the carriage 100 is then reversed, dragging the media 200 along with the carriage 100, and then the picker assembly and/or a robot move to a location in which the media 200 is to be deposited. Then the carriage 100 translates and extends toward the place where the media 200 is to be deposited, such as a drive or a storage shelf. When the media 200 is situated such that it is no longer moveable in the direction of translation, such as where the rear surface of the media 200 abuts a rear wall of a storage slot or is fully inserted into a drive, then the carriage 100 is further translated and extended in the same direction, effecting a condition as shown in FIG. 9C in which the arms 114, 116 start to pivot outwardly. Further translation of the carriage 100 causes the arms 114, 116 to pivot further outwardly to attain a condition such as shown in FIG. 9D. The carriage 100 is then translated in a reverse direction and retracted away from the media 200 as shown in FIG. 9E, in a state where the arms 114, 116 remain pivotably outward. Further translation of the carriage 100 in a direction away from the media 200 results in the carriage 100 being retracted into the housing 12 and the side edges of the housing 12 acting upon the outer surfaces of the arms 114, 116 to pivot them inward and such that the bi-stable spring 308 assumes a second state of stability.

Although the preferred embodiments of the present invention employ coiled extension springs arranged in an over-center condition in order to achieve a bi-stable position for the arms 114, 116, it should be appreciated that other devices for achieving such bi-stability may also be advantageously employed within other embodiments of the present invention. For example, a bi-stable beam such as a so-called double curved beam, may be utilized. Also, a bi-stable magnet, such as those used for actuating values, may optionally be employed. Further, bi-stable latching relays may be employed, though are considered to be less desirable because they utilize an electrically actuated solenoid.

While exemplary embodiments have been presented in the foregoing description of the invention, it should be appreciated that a vast number of variations within the scope of the invention may exist including other methods of determining probe insertion positioning. The foregoing examples are not intended to limit the nature or the scope of the invention in any way. Rather, the foregoing detailed description provides those skilled in the art with a foundation for implementing other exemplary embodiments of the invention.

I claim:

1. A carriage adapted to pick, move, and deposit a media possessing a pick feature in a data storage library, said carriage comprising:
    a main body portion;
    at least one jaw member possessing at least one finger substantially at a distal end thereof, said at least on finger adapted and configured to selectively, cooperatively, operationally engage said pick feature, said at least one jaw member pivotably connected to said main body portion and pivotable between a closed position whereby said at least one finger is allowed to cooperatively, operatively engage said pick feature and an open position whereby said at least one finger is not allowed to cooperatively, operatively engage said pick feature;
    at least one bias member acting on said at least one jaw member to bias said at least one jaw member toward said closed position;
    an actuator operatively acting on said at least one jaw member, said actuator adapted and configured to selectively cause said at least one jaw member to pivot toward said open position; and
    a plate pivotably connected to said main body portion and adapted and configured to pivot between a first position where said plate substantially does not forcefully move said actuator and a second position where said plate substantially does forcefully move said actuator, and when said plate is in said first position, said actuator does not operatively act to cause said at least one jaw member to pivot toward said open position, and when said plate is in said second position, said actuator operatively acts to cause said at least one jaw member to pivot toward said open position.

2. A carriage according to claim 1 further comprising:
    means for maintaining said at least one jaw in said open position.

3. A carriage according to claim 2 wherein said maintaining means includes device designed to attain a bi-stable condition.

4. A carriage according to claim 3 wherein said actuator includes at least one actuator component pivotably connected to said main body portion about an axis of rotation, wherein said bi-stable spring comprises a linearly extending, coiled, extension spring, and whereby said bi-stable spring attains one state of stability when the linear extension of said bi-stable spring is disposed substantially on one side of said axis of rotation and whereby said bi-stable spring attains a second state of stability when the linear extension of said bi-stable spring is disposed substantially on the opposite side of said axis of rotation.

5. A carriage according to claim 1 wherein said actuator comprises a first actuator lever pivotably connected to said main body portion and a second actuator lever pivotably connected to said main body portion, said first actuator having a peripheral surface bearing a first set of spaced teeth, said second actuator lever having a peripheral surface bearing a second set of spaced teeth adapted to and configured to intermesh with the first set of spaced teeth such that pivoting of either one of said first actuator lever or said second actuator lever causes a concomitant pivoting of the other of said first actuator lever and said second actuator lever.

6. A carriage according to claim 5 further comprising means for urging said first actuator lever and said second actuator lever in either a first rotational direction of pivoting or a second rotation directional of pivoting.

7. A carriage according to claim 6 wherein said urging means comprises a spring disposed in an off-center condition relative to the axis of pivoting of at least one of said first actuator lever and said second actuator lever.

8. A carriage according to claim 6 wherein said first actuator lever includes an anvil surface adapted to abut said plate and said second actuator lever includes a boss surface adapted to abut said at least one jaw such that when said plate is pivoted into said second position, said plate forcefully moves said anvil surface, which causes said first actuator lever to pivot whereby the intermeshed condition of said teeth in turn causes said second actuator lever to pivot, which causes said boss surface to forcefully abut and pivot said at least one jaw toward said open position.

9. A carriage according to claim 8 wherein, when said at least one jaw pivots toward said open position, said urging means urges said first actuator lever and said second actuator lever such that said at least one jaw is maintained in said open position.

10. A carriage adapted to maneuver media in a data storage library, said carriage comprising:
- a main body portion;
- a pair of jaws mounted on said main body portion and moveable between a close position and an open position;
- a plate connected to and moveable between a first position and a second position with respect to said main body portion; and
- means for causing said pair of jaws to move from said close position to said open position when said plate is moved from said first position to said second position.

11. A carriage according to claim 10 further comprising:
- first means for maintaining said pair of jaws in said close position when said pair of jaws is in said close position; and
- second means for maintaining said pair of jaws in said open position when said pair of jaws is in said open position.

12. A carriage according to claim 10 further comprising means for biasing said plate toward said first position.

13. A carriage according to claim 11 wherein said plate is pivotably moveable between said first position and said second position.

14. A system for maneuvering media in a data storage library comprising:
- an endless, looped belt moveable in either of two directions of translation;
- a carriage comprising:
  - a main body portion;
  - a pair of jaws connected to said main body portion and moveable between a close position and an open position;
  - a plate connected to and moveable between a first position and a second position with respect to said main body portion; and
  - means for causing said pair of jaws to move from said close position to said open position when said plate is moved from said first position to said second position; and
  - said plate being connected to said belt such that if said main body portion becomes substantially immovable in a first direction of translation of said belt, then further translation of said belt in said first direction of translation causes said plate to move from said first position to said second position.

15. A system according to claim 14 further comprising:
- first means for maintaining said pair of jaws in said closed position when said pair of jaws is in said close position; and
- second means for maintaining said pair of jaws in said open position when said pair of jaws is in said open position.

16. A system according to claim 15 wherein said second maintaining means includes a bi-stable linearly extending, coiled extension spring.

17. A method of operating a carriage for maneuvering media in a data storage library, the method comprising:
- (a) providing (1) a translator moveable in either of two directions of translation; and (2) a carriage comprising (i) a main body portion, (ii) a pair of jaws connected to said main body portion and moveable between a close position and an open position, and (iii) a plate connected to and moveable between a first position and a second position with respect to said main body portion;
- (b) mounting said plate to said translator for concomitant translation therewith;
- (c) translating said translator in a first direction of translation while said plate is in said first position and said pair of jaws is in said closed position until said main body portion becomes substantially immovable in said first direction of translation; and
- (d) after step (c), further translating said translator in said first direction of translation whereby said plate moves from said first position to said second position and said pair of jaws move from said close position to said open position.

18. A method according to claim 17 wherein said plate is pivotably connected to and pivotably moveable between said first position and said second position and wherein in step (d) said plate pivotably moves from said first position to said second position.

19. A method according to claim 17 further comprising:
- (e) after step (d), translating said translator in said second direction of translation whereby said plate moves from said second position to said first position, while maintaining said pair of jaws in said open position.

20. A method according to claim 17 wherein in step (c) a media is clasped between said pair of jaws and wherein step (d) said media is released from said jaws.

* * * * *